US008219307B2

(12) United States Patent
Valex et al.

(10) Patent No.: US 8,219,307 B2
(45) Date of Patent: Jul. 10, 2012

(54) AIRCRAFT NAVIGATION AID DEVICE

(75) Inventors: Laurent Valex, Toulouse (FR); André Bourdais, Toulouse (FR); Thomas Sauvalle, Toulouse (FR); Eric Peyrucain, Saint Genies Bellevue (FR)

(73) Assignee: Airbus Operations SAS, Toulouse (FR)

( * ) Notice: Subject to any disclaimer, the term of this patent is extended or adjusted under 35 U.S.C. 154(b) by 405 days.

(21) Appl. No.: 12/595,891

(22) PCT Filed: Apr. 7, 2008

(86) PCT No.: PCT/FR2008/000486
§ 371 (c)(1), (2), (4) Date: Oct. 14, 2009

(87) PCT Pub. No.: WO2008/142271
PCT Pub. Date: Nov. 27, 2008

(65) Prior Publication Data
US 2010/0145605 A1 Jun. 10, 2010

(30) Foreign Application Priority Data
Apr. 16, 2007 (FR) .................................... 07 02730

(51) Int. Cl.
*G06F 19/00* (2006.01)

(52) U.S. Cl. ........................................ 701/120; 340/971

(58) Field of Classification Search .................. 701/120, 701/528; 340/971
See application file for complete search history.

(56) References Cited

U.S. PATENT DOCUMENTS

| | | | |
|---|---|---|---|
| 5,740,047 | A | 4/1998 | Pilley |
| 6,690,298 | B1 | 2/2004 | Barber |
| 2008/0186207 | A1 | 8/2008 | Fetzmann |
| 2008/0314499 | A1 | 12/2008 | Begon |

FOREIGN PATENT DOCUMENTS

| | | |
|---|---|---|
| FR | 2 883 984 | 10/2006 |
| FR | 2 884 020 | 10/2006 |
| WO | 03/048887 | 6/2003 |

OTHER PUBLICATIONS

International Search Report dated Dec. 9, 2008 w/ English translation.
Written Opinion of the International Searching Authority with English translation.

*Primary Examiner* — Eric Culbreth
(74) *Attorney, Agent, or Firm* — Dickinson Wright PLLC

(57) ABSTRACT

An aircraft navigation aid device includes at least one flight management system, an airport navigation aid unit which is incorporated in this flight management system, and a common interface unit.

8 Claims, 2 Drawing Sheets

AIRCRAFT NAVIGATION AID DEVICE

FIELD OF THE INVENTION

The present invention relates to an aircraft navigation aid device, in particular for a transport airplane.

BACKGROUND OF THE RELATED ART

This navigation aid device comprises, in particular, a flight management system, for example of FMS type, which comprises usual flight management means which supply information intended, in particular, for the in-flight navigation of the aircraft. This flight management system is primarily designed for the management of the aircraft in flight, and in particular in-flight navigation.

Moreover, regarding airport navigation, that is, the movement on the ground of an airplane at an airport, independent airport navigation aid means are known, of OANS ("On-board Airport Navigation System") type, which provide information to the crew to assist it when navigating on the ground at the airport, between landing and the final destination position at the airport or between the departure position at the airport and take-off. Such airport navigation aid means can, in particular, provide video images intended for airport map displays. Generally, the display of such a function is produced in video mode through a video concentrator of CMV ("Concentrator Multiplexer Video") type.

Consequently, there is a difficulty, with a usual architecture of this type, for the navigation to be performed continually between the in-flight phases and ground phases. In particular, the symbol system relating to the flight management system is managed separately from the symbol system relating to the airport navigation aid means, because the latter symbol system corresponds to a video layer, which means that the corresponding data cannot be mixed, only overlaid.

For example, when producing a display, in particular on a navigation screen of ND ("Navigation Display") type, relating to airport data, data relating to the flight plan derived from the flight management system can be displayed only in overlay mode, and it is impossible to manage the priorities for displaying certain messages that are considered more important.

Furthermore, the airport navigation aid means use navigation data that are stored in a specific navigation data base, which is itself stored in a memory of MMC ("Mass Memory Card") type. This navigation data base (and its management) is completely independent of the data base used by the flight management system. Also, identical information which must be stored in both data bases, such as information indicating the position of the threshold of a landing runway for example, must necessarily be duplicated.

From documents FR-2 884 020 and FR-2 883 984, airport navigation aid devices are known.

SUMMARY OF THE INVENTION

The present invention relates to an aircraft navigation aid device which offers a particular architecture making it possible to overcome the abovementioned drawbacks.

To this end, according to the invention, said device of the type comprising a flight management system which comprises flight management means, is noteworthy in that:

said device also comprises airport navigation aid means;

said airport navigation aid means are incorporated in said flight management system; and said device also comprises interface means which are common to said flight management means and to said airport navigation aid means and which comprise:

input means enabling an operator to enter into said flight management system data relating, optionally, to said flight management means and to said airport navigation aid means; and at least one display screen capable of presenting both information relating to said flight management means and information relating to said airport navigation aid means.

Thus, thanks to the incorporation of the airport navigation aid means (of OANS type) in the flight management system (of FMS type), numerous advantages compared to a usual architecture of the abovementioned type are obtained:

the use of a CMW-type concentrator is no longer necessary, because there is no longer a need to use a video stream to display airport information;

since the airport navigation aid means are fully incorporated in the flight management system, there is no longer any data overlay problem, which makes it possible in particular to improve the use and the display of the information throughout the duration of the flight and in particular on transitions between ground and flight phases. This makes it possible in particular to obtain a ground-flight continuity, as specified hereinbelow;

reduced footprint, particularly because of the elimination of a module (OANS) that is necessary in the abovementioned usual architecture for managing airport navigation information; and the wiring needed for the device is simplified.

Furthermore, the provision of unique and common interface means also presents numerous advantages, and in particular:

the possibility of eliminating a human/machine interface (compared to a usual architecture), which makes it possible to merge the two human/machine interaction means which are currently used exclusively, and treat them uniformly; and since the common interface means incorporate a common management of the graphic interface (between the flight management means and the airport navigation aid means), they make it possible to produce a ground-flight continuity, avoiding the cases of display or control conflict. In particular, these interface means allow the simultaneous display of the symbols (flight plan) obtained from the flight management means and those (airport map) obtained from the airport navigation aid means. This is particularly useful in the approach phase in particular.

Moreover, in a preferred embodiment, said navigation aid device also comprises a common database which comprises both navigation data and airport data. This preferred embodiment makes it possible to overcome the drawbacks (cost, footprint, memory size problems, etc.) associated with the use of several data bases and avoids having to duplicate identical information in two different data bases.

In this case, in a first simplified variant embodiment, said common data base is simply incorporated in said flight management system.

Furthermore, in a second preferred variant embodiment, said common data base is incorporated in a data base server which is linked by a single data transmission link to said flight management system. This data transmission link is intended for the transmission of both navigation data and airport data. This second variant embodiment makes it possible to simplify the actions involved in downloading and managing inputs and outputs to the flight management system in particular.

Furthermore, in a particular embodiment, said flight management aid device comprises:

- an incorporated maintenance device which is common to said flight management means and to said airport navigation aid means. This makes it possible in particular to rationalize the maintenance procedures; and/or
- navigation and guidance functions which are common to said flight management means and to said airport navigation aid means. Thus, ground-flight continuity no longer applies only to the display, but also to the navigation and guidance of the aircraft, which makes it possible in particular to create a complete trajectory of the type from a departure parking point to an arrival parking point from one airport to another ("gate-to-gate") [with the flight plan extended to the ground]; and/or
- data link means which are common to said flight management means and to said airport navigation aid means, which makes it possible to manage in an identical way the information provided by a controller located on the ground both for taxiing on the ground and for the flight.

BRIEF DESCRIPTION OF THE DRAWINGS

The figures of the appended drawing will clearly show how the invention can be produced. In these figures, identical references designate similar elements.

DETAILED DESCRIPTION OF THE INVENTION

Figure 1:
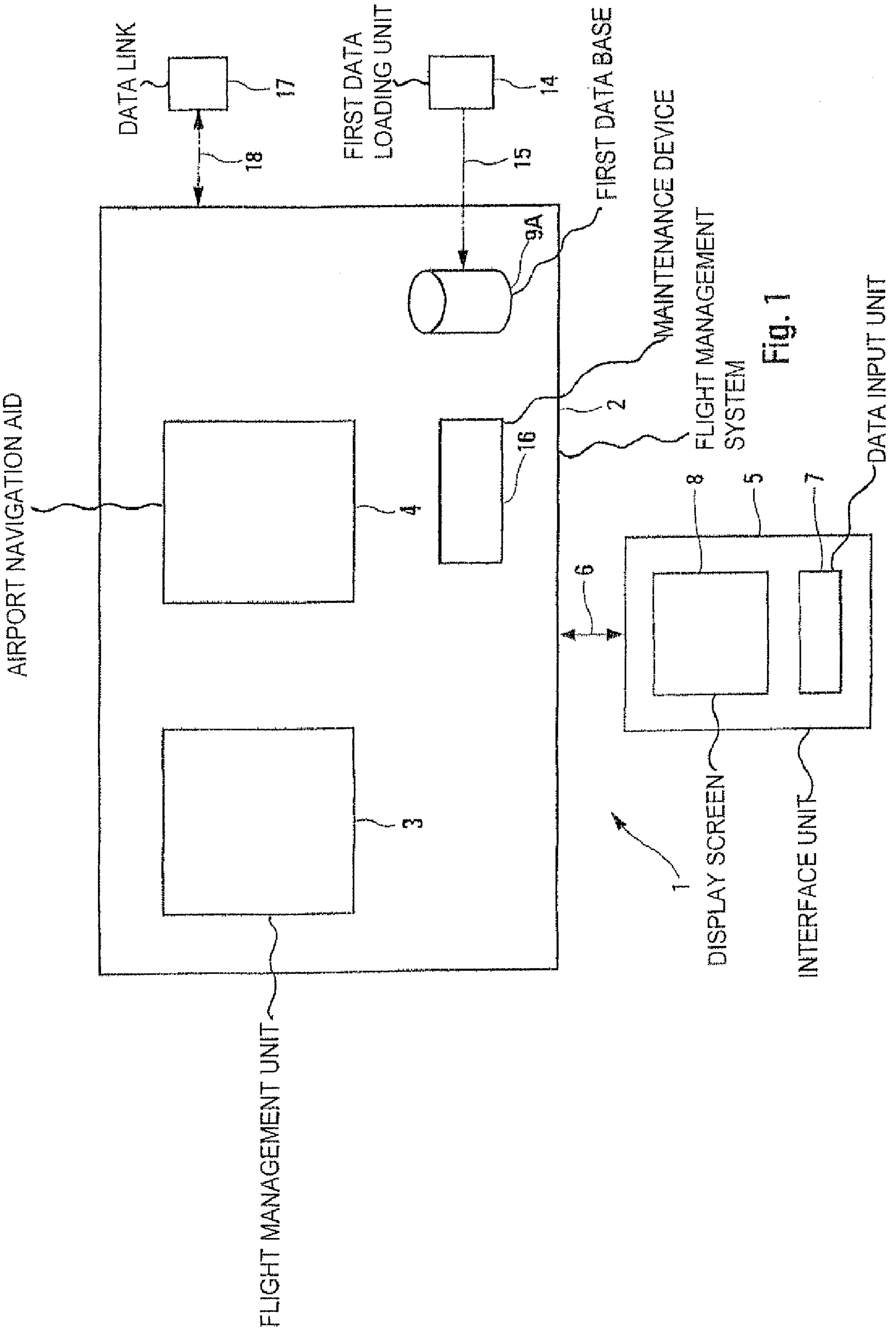
FIGS. 1 and 2 are block diagrams of two different embodiments of an navigation aid device according to the invention.
Figure 2:
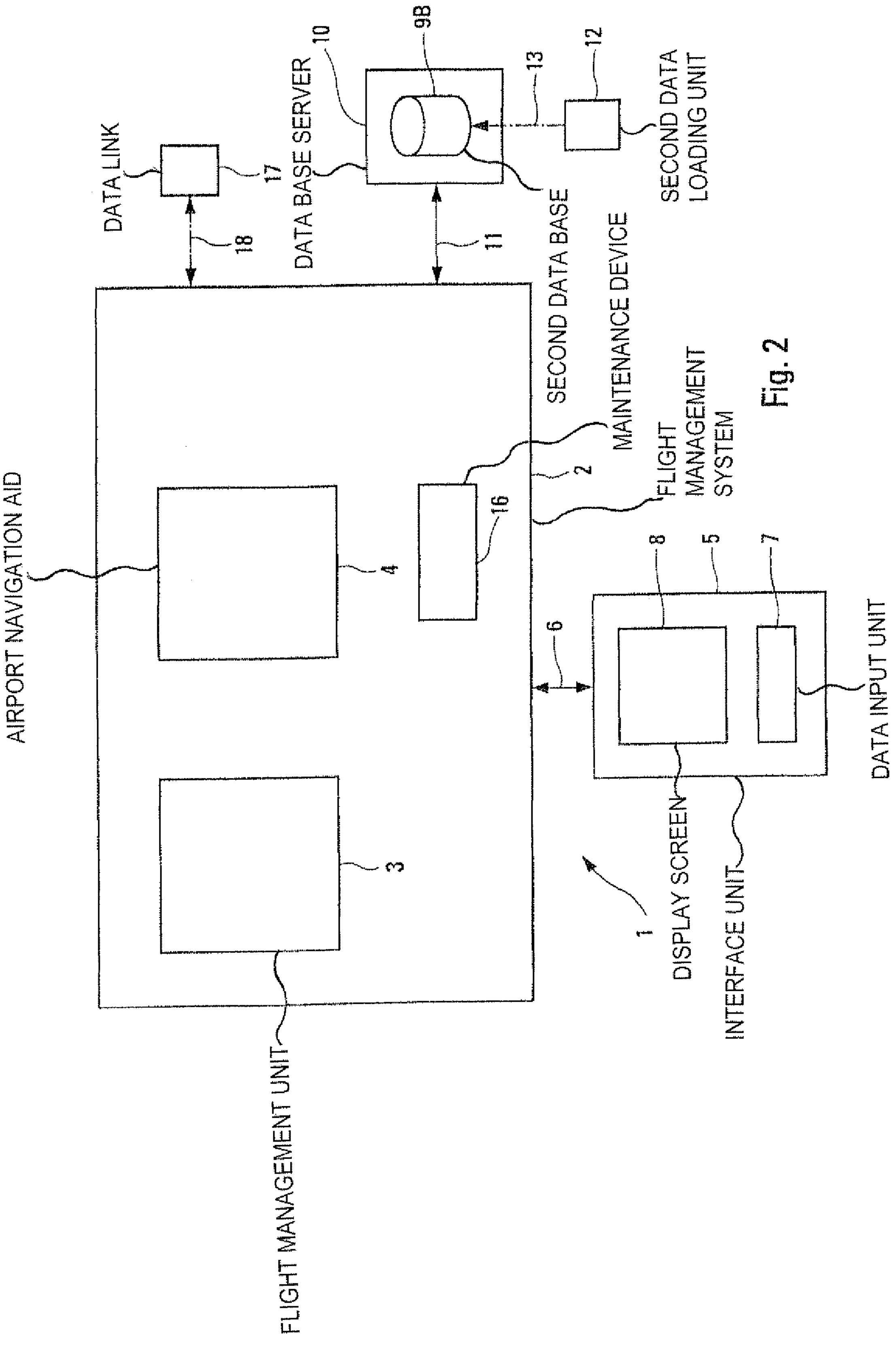

The device 1 according to the invention and diagrammatically represented according to two different embodiments in FIGS. 1 and 2 is intended to assist in the navigation of an aircraft, in particular a transport airplane, not represented, both in flight and on the ground.

Said device 1 is of the type comprising a flight management system 2, for example of FMS type, which comprises the usual flight management means 3, which provide, in particular, information intended for the in-flight navigation of the aircraft.

According to the invention, as represented in FIGS. 1 and 2:

- said device 1 also comprises airport navigation aid means 4, for example of OANS ("On-board Airport Navigation System") type, which in the usual way provide information to the crew of the aircraft to assist it when navigating on the ground at an airport, between the landing position and the final destination position at the airport or between the initial departure position at the airport and the take-off position;
- said airport navigation aid means 4 (on the ground) are incorporated in said flight management system 2 (which is intended for in-flight navigation); and
- said device 1 also comprises interface means 5 which are common to said flight management means 3 and to said airport navigation aid means 4, which are linked via a link 6 to said flight management system 2 and which comprise at least:
  - input means 7, for example a keyboard with alphanumeric keys and/or a mouse, enabling an operator, in particular a pilot of the aircraft, to enter into said flight management system 2 either data relating to said flight management means 3 or data relating to said airport navigation aid means 4; and
  - at least one display screen 8, for example a navigation screen of ND ("Navigation Display") type, which is capable of presenting, simultaneously or independently, information relating to said flight management means 3 and information relating to said airport navigation air means 4.

Thus, the incorporation of the airport navigation aid means 4 (for example of OANS type) in the flight management system 2 (for example of FMS type) means that the device 1 offers numerous advantages compared to a usual architecture for which the means 3 and 4 are completely separate and totally independent:

- the use of a CMV-type concentrator is not necessary, because there is no need to use a video stream to display airport information;
- since the airport navigation aid means 4 are fully integrated in the flight management system 2, there is no data overlay problem, which makes it possible in particular to improve the use and the display of the information throughout the duration of the flight, and in particular on transitions between the ground and flight phases. There is thus the capability of obtaining ground-flight continuity, as specified hereinbelow;
- the footprint is reduced, notably because of the elimination of a module (OANS) that is needed in the abovementioned usual architecture for managing the airport navigation information; and
- the wiring required for the device 1 is simplified.

Furthermore, the provision of unique and common interface means 5 also offers numerous advantages, and in particular the possibility of eliminating a human/machine interface (compared to a usual architecture).

Furthermore, said common interface means 5 incorporate a common management of the graphic interface (between the flight management means 3 and the airport navigation aid means 4). Thus, they provide for ground-flight continuity, by making it possible to avoid display or control conflict cases. In particular, these interface means 5 allow the simultaneous display of symbols (relating to a flight plan in particular) obtained from the flight management means 3 and symbols (relating to an airport map in particular) obtained from the navigation aid means 4. This is particularly useful in the approach phase in particular.

Moreover, in a preferred embodiment, said navigation aid device 1 also comprises a common database 9A, 9B which comprises both navigation data (in flight) and airport data (that is, ground navigation data). This preferred embodiment overcomes the drawbacks (cost, footprint, etc.) associated with the use of several databases and avoids having to duplicate identical information, such as information indicating the position of the threshold of a landing runway for example, in two different data bases.

In a first simplified variant embodiment, represented in FIG. 1, said common data base 9A is simply incorporated in said flight management system 2.

Furthermore, in a second preferred embodiment, represented in FIG. 2, said common data base 9B is incorporated in a usual data base server 10 which is linked to said flight management system 2 via a single data transmission link 11, for example of ARINC 429 or AFDX type. This data transmission link 11 is intended for the transmission of both navigation data and airport data, from said data base 93 to said means 3 and 4. Furthermore, the device 1 includes data loading means 12, which are linked via a link 13 (represented by chain-dotted lines) to said server 10. These means 12 are capable of providing it with information for updating or complementing said data base 93. This notably simplifies the actions involved in downloading and managing inputs and outputs to and from the means 3 and 4.

Obviously, in the embodiment of FIG. 1, the device 1 can also include data loading means 14 which are capable of providing updates to the data base 9A, as represented by a link 15 represented by chain-dotted lines.

Furthermore, in a particular embodiment, said flight management system 2 also includes:

- an incorporated maintenance assembly 16, or BITE ("Built-In Test Equipment"), which is common to said flight management means 3 and to said airport navigation aid means 4. This in particular alleviates the maintenance procedures for the device 1; and/or
- navigation and guidance functions (not represented) which are common to said flight management means 3 and to said airport navigation air means 4. These common (integrated) functions mean that ground-flight continuity no longer applies only to the display (interface means 5), but also to the navigation and guidance of the aircraft, which makes it possible in particular to produce a complete trajectory of the type from a departure parking point to an arrival parking point from one airport to another ("gate-to-gate") [with the flight plan extended to the ground]; and/or
- data link means 17 which are common to said flight management means 3 and to said airport navigation aid means 4, which makes it possible to manage in an identical manner the information supplied in particular by a controller located on the ground both for taxiing on the ground and for the flight. These data link means 17, which are linked via a link 18 to said flight management system 2, can be part of an usual data transmission system, preferably of ground-flight type.

The incorporation of the airport navigation aid means 4 in the flight management system 2 means that aircraft position information, generated by these airport navigation aid means 4, which are particularly accurate, can be used in the flight management means 3. For example, in the landing and take-off phases, the accuracy of the position of the aircraft makes it possible to increase the robustness regarding guidance with an LOC-type beam. Furthermore, the calculations that are carried out, in the usual way, with great integrity in the flight management means 3, can be used by the airport navigation aid means 4. The means 3 and 4 therefore become, thanks to the invention, highly complementary.

Furthermore, the flight plan and the airport map can be displayed simultaneously on a navigation screen, for example on the display screen 8, both on the ground and in flight. The flight plan can thus be complemented so as to obtain a flight plan from departure parking point to arrival parking point, by including therein the taxiing on the ground from the departure terminal to the take-off runway and from the landing runway to the arrival terminal. This complete flight plan can be presented graphically or textually, by including in the ground taxiing part points on the ground that are identical to the waypoints used in the usual way in flight by the flight management means 3.

Furthermore, it is possible to provide, in the interface means 5, means making it possible to display automatically on the display screen 8, depending on the current position of the aircraft, either information relating to airport navigation or information relating to in-flight navigation.

Numerous additional and particularly advantageous features of the present invention are described herein below:

A/ Display of the Information Obtained from the Flight Management Means 3 and from the Airport Navigation Aid Means 4 on the Same Display Screen 8.

1. Today, when the pilot uses a usual airport navigation system, textual information associated with the airport zone is displayed in the top right-hand corner of the display screen. If the system displayed is the flight management system, it is the information associated with the flight that is given in this screen zone. The integration of the two means 3 and 4 makes it possible to display alternately this information according, for example, to the position of the airplane, or the flight phase.

2. With the usual architecture, the activation of the airport navigation system or of the flight management system depends on the selected display scale. If the scale is 5 NM (nautical miles) or more, only the flight management information is presented, and if the scale is less than 5 NM, only the airport navigation information is presented. With the integration of the two functions 3 and 4 in a single system 2:

- it is possible to display airport information to be defined with larger scales. Today, at the scales greater than or equal to 5 NM, only a doublet of basic length representing the selected runway is presented. With the invention, it is possible to also present the general form of the airport, as well all the runways, at the 10 and 20 NM scales;
- the flight plan can be displayed with scales less than 5 NM to be defined. In the same way, it is possible to envisage defining a flight plan and airport information presentation logic based on the flight phase. For example:
  - in the take-off phase with a scale of 5 NM, the flight plan is presented with all the airport information;
  - in the approach phase with a scale of 10 NM, the flight plan is presented with the general form of the airport; and
  - in the landing phase with a scale of 2 NM, the flight plan is presented with the missed-approach trajectory and all the airport information.

3. The integration of the airport navigation aid means 4 in the flight management system 2 means that the user can be given the option to separately select the airport information that he wants displayed, instead of having an "all-or-nothing" type display of all the airport information.

4. The display of the vertical profile already produced in the flight management system 2 can be enriched by adding airport information such as the placement of the most significant buildings. The integration of the two functions into a single system is advantageous in this case if the solution adopted is to integrate the building heights in the airport data base.

5. The selection of the runway for the management of the flight can be done directly on the airport map.

6. The flight plan can be extended, and begin at the embarkation gate to end at the disembarkation gate, either graphically (map) or textually (list of points).

B/ Integration of the Interaction Means of the Flight Management Means 3 and of the Airport Navigation Aid Means 4.

1. Interactive links to the airport objects can be added to the contextual menu that already exist on the map. New functionalities can also be added. For example, when the pilot clicks to select the airport symbol "ARPT" in PLAN mode, the airport map is displayed in a part of the screen.

2. All of the data and functions associated with airport navigation can be controlled from pages of a multifunction screen of MFD ("Multifunction Display") type, in particular from an airport page, in the same way as the data and functionalities associated with flight management. This solution makes it possible to avoid the use of the control means dedicated to airport navigation ("Soft Control Panel"), all the functions and information of which can be included in the "Airport" page of the MFD screen. In particular, it is possible to look up any airport map during the taxiing or flight phases, regardless of the display mode.

3. In all cases, the architecture according to the invention makes it possible to enrich the “Airport” page with the airport information now available. In particular, it is possible to envisage displaying the airport directly in the MFD page, once it has been selected.

4. The messages sent by data link can contain authorizations given by an air traffic controller to indicate to the pilot the parts of its route on the ground that are authorized.

C/ Navigation/Positioning.

1. An inertial unit alignment function is now available only in the flight management system 2. With the integration of the airport navigation aid means 4, it becomes possible to propose the manual alignment of the inertial units from an airport map reference position. Similarly, the automatic alignment of the inertial units on the position of the parking point can also be performed thanks to the use of the position of the stand and parking areas (information available in the airport data base), immediately the embarkation gate and the type of the airplane have been entered by the pilot.

2. Checks on the position information can be proposed graphically on the airport map. Markers indicating the positions supplied by the various sensors are, in this case, displayed on the airport map, with the circles of uncertainty that are associated with them.

D/ Predictions.

The prediction function that is already available in the flight management system 2 can be extended to and offered on the ground, so as to enable the pilot to know the time required between landing and the parking point or between the parking point and the take-off threshold. The taxiing speed taken into account can be an average speed, or a value entered by the pilot, and the distance is determined from the ground route plan (received by data link or entered by the pilot). Such a functionality can be used by an air traffic controller as means of controlling and optimizing movements on the ground.

E/ Radio Frequencies.

Today, the flight management system 2 allows for the frequency of the radio navigation aids to be set automatically. The integration of the airport navigation aid and flight management means 4 and 3 makes it possible to graphically identify the areas of application of a radio navigation or communication frequency, indicating to the pilot the right moment to modify the frequency, and the frequency to be set. This frequency can then be proposed automatically for validation by the pilot in the management panel of the radio means (frequency proposed automatically as “standby” frequency).

F/ Various Functional Enhancements.

1. The functionality of continuous transition between the modes and the display scales, that already exists for the scales dedicated to the airport navigation aid means 4, can be extended to the transitions between modes and scales intended for the flight management means 3.

2. The functionality of manually moving the map, via a cursor (“map drag”), and the functionality of elastic movement (functionality making it possible to return to the initial display after a manual movement when the pilot releases the controller) or “elastic drag”, that already exist for the scales dedicated to the airport navigation aid means 4, can be extended to the transitions between modes and scales intended for the flight management means 3.

3. The display of the VOR (“VHF Omnidirectional Range”) and ADF (“Automatic Direction Finder”) radio navigation indicators can also be extended to the ground during the taxiing phase on the airport map, so as, for example, to check that they are operating correctly. All the radio means can also be displayed on the ground on the airport map.

4. Today, the flight management system 2 supplies position reports using the data link function. By using a data link function common to both flight management and airport navigation aid means 3 and 4, this facility can be extended to allow for the communication of ground position reports during the taxiing phases.

The invention claimed is:

1. An aircraft navigation aid device, said device comprising:

a flight management system which comprises
 flight management means; and
 airport navigation aid means incorporated in said flight management system; and
interface means which are common to said flight management means and said airport navigation aid means, wherein said interface means comprises:
 data input means enabling an operator to enter data into said flight management system; and
 at least one display screen configured to present information,
wherein said device further comprises navigation and guidance functions that are common to said flight management means and said airport navigation aid means and which enable creation of a complete trajectory from a departure parking point to an arrival parking point from one airport to another.

2. The device as claimed in claim 1, further comprising at least one common data base which comprises both in-flight navigation data and airport data.

3. The device as claimed in claim 2, wherein said at least one common data base is incorporated in said flight management system.

4. The device as claimed in claim 2, wherein said at least one common data base is incorporated in a data baser server which is linked by a single data transmission link to said flight management system, said data transmission link for transmission of both in-flight navigation data and airport data.

5. The device as claimed in claim 1, further comprising an incorporated maintenance device which is common to said flight management means and said airport navigation aid means.

6. The device as claimed in claim 1, wherein said flight management system comprises a prediction function used on the ground to enable a pilot to know a taxiing time.

7. The device as claimed in claim 1, further comprising data link means which are common to said flight management means and said airport navigation aid means.

8. An aircraft, comprising a navigation aid device as specified in claim 1.

* * * * *